(12) United States Patent
Jin

(10) Patent No.: US 8,014,094 B1
(45) Date of Patent: Sep. 6, 2011

(54) DISK DRIVE EXPEDITING DEFECT SCAN WHEN QUALITY METRIC EXCEEDS A MORE STRINGENT THRESHOLD

(75) Inventor: Ming Jin, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 110 days.

(21) Appl. No.: 12/551,207

(22) Filed: Aug. 31, 2009

(51) Int. Cl.
  *G11B 27/36* (2006.01)
(52) U.S. Cl. .......................................... 360/31
(58) Field of Classification Search ........................ None
  See application file for complete search history.

(56) References Cited

U.S. PATENT DOCUMENTS

| | | | |
|---|---|---|---|
| 5,150,050 A | 9/1992 | Genheimer et al. | |
| 5,216,655 A | 6/1993 | Hearn et al. | |
| 5,280,395 A | 1/1994 | Matsuzaki | |
| 5,333,140 A | 7/1994 | Moraru et al. | |
| 5,812,334 A | 9/1998 | Behrens et al. | |
| 5,895,438 A | 4/1999 | Yomtoubian | |
| 6,204,660 B1 | 3/2001 | Lee | |
| 6,219,814 B1 | 4/2001 | Coker et al. | |
| 6,223,303 B1 | 4/2001 | Billings et al. | |
| 6,239,931 B1 | 5/2001 | Chung et al. | |
| 6,292,913 B1 | 9/2001 | Son | |
| 6,332,204 B1 | 12/2001 | Russell | |
| 6,366,081 B1 | 4/2002 | Tan et al. | |
| 6,384,999 B1 | 5/2002 | Schibilla | |
| 6,405,342 B1 | 6/2002 | Lee | |
| 6,490,691 B1 | 12/2002 | Kimura et al. | |
| 6,606,211 B1 * | 8/2003 | Lim et al. ......................... | 360/53 |
| 6,654,193 B1 | 11/2003 | Thelin | |
| 6,691,255 B1 | 2/2004 | Rothberg et al. | |
| 6,704,153 B1 | 3/2004 | Rothberg et al. | |
| 6,731,442 B2 | 5/2004 | Jin et al. | |
| 6,781,688 B2 | 8/2004 | Kren et al. | |
| 6,906,883 B2 * | 6/2005 | Chu et al. ......................... | 360/75 |
| 6,947,232 B2 | 9/2005 | Lim et al. | |
| 6,950,967 B1 | 9/2005 | Brunnett et al. | |
| 7,050,252 B1 * | 5/2006 | Vallis ............................... | 360/53 |
| 7,072,129 B1 | 7/2006 | Cullen et al. | |
| 7,656,763 B1 * | 2/2010 | Jin et al. ...................... | 369/53.15 |
| 2001/0046196 A1 | 11/2001 | McKernan | |
| 2002/0114506 A1 | 8/2002 | Hiroi et al. | |
| 2004/0153949 A1 | 8/2004 | Ro et al. | |
| 2006/0013095 A1 | 1/2006 | Liu et al. | |
| 2006/0056088 A1 | 3/2006 | Kudoh et al. | |
| 2006/0126204 A1 | 6/2006 | Taniguchi et al. | |
| 2007/0089031 A1 | 4/2007 | Huffman et al. | |
| 2008/0262643 A1 | 10/2008 | Creigh et al. | |

\* cited by examiner

*Primary Examiner* — Daniell L Negron
*Assistant Examiner* — Regina N Holder

(57) ABSTRACT

A disk drive is disclosed comprising a head actuated over a disk comprising a plurality of data tracks. Data is read from one of the data tracks to generate a read signal, and a quality metric is generated in response to the read signal. When the quality metric exceeds a first threshold, a defect is detected in at least part of the data track. When the quality metric exceeds a second threshold different than the first threshold, the data track is reread to regenerate the quality metric, and when the quality metric exceeds the second threshold at least twice, the defect is detected.

14 Claims, 6 Drawing Sheets

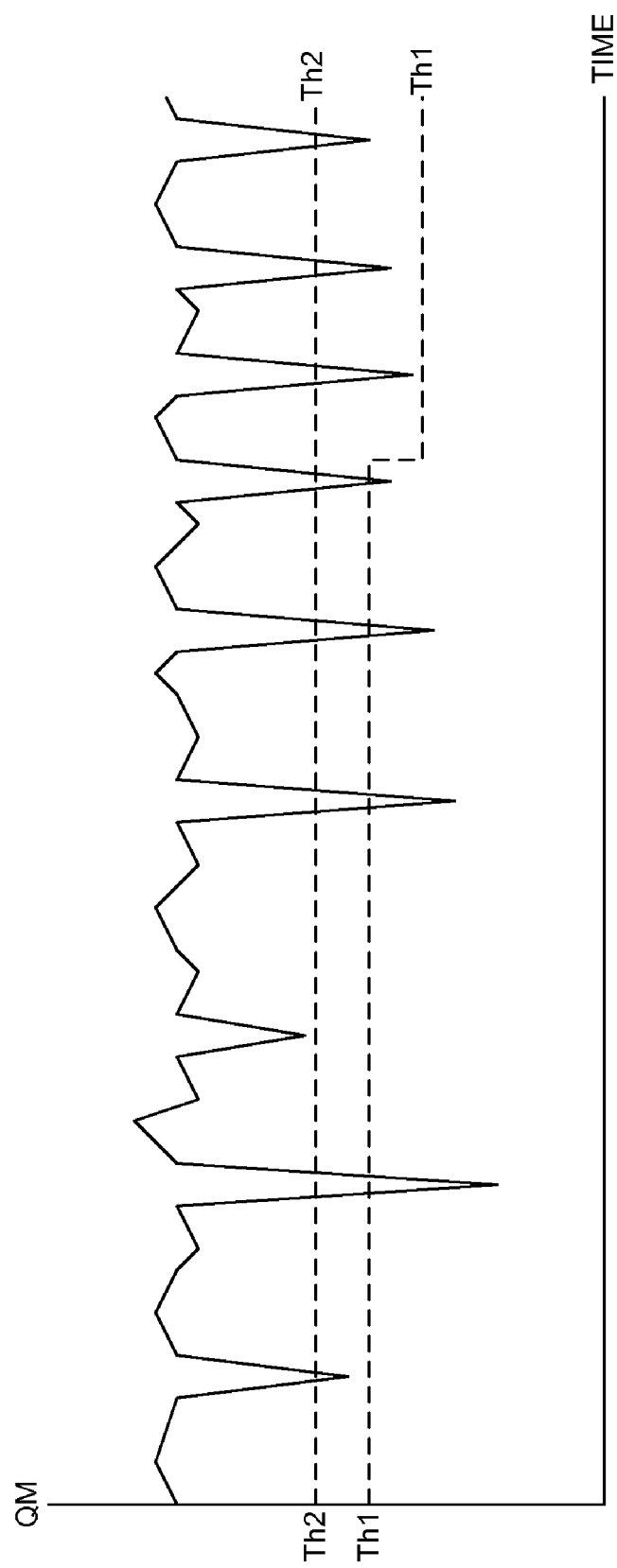

DISK DRIVE EXPEDITING DEFECT SCAN WHEN QUALITY METRIC EXCEEDS A MORE STRINGENT THRESHOLD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1A shows a prior art disk format 2 comprising a number of data tracks 4 defined by a number of servo sectors $6_0$-$2_N$ recorded around the circumference of each data track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

A defect scan of the data sectors may be performed during manufacturing or while the disk drive is deployed in the field. The defect scan typically involves writing a 2T test pattern to a data track and evaluating the read signal while reading the data track to detect defective areas on the disk. Defects on the disk may cause degradation in the amplitude of the read signal, but it may also cause timing errors when reading data from the data track. FIG. 1B shows an example defect free sinusoidal read signal generated from reading a 2T test pattern, wherein the peak-samples may be evaluated to detect amplitude degradation, and zero-samples may be evaluated to detect timing errors.

BRIEF DESCRIPTION OF THE DRAWINGS

FIG. 5 illustrates an embodiment of the present invention wherein the first threshold is decreased to decrease the probability of detecting a hard defect.

DETAILED DESCRIPTION OF EMBODIMENTS OF THE INVENTION

Figure 2A:
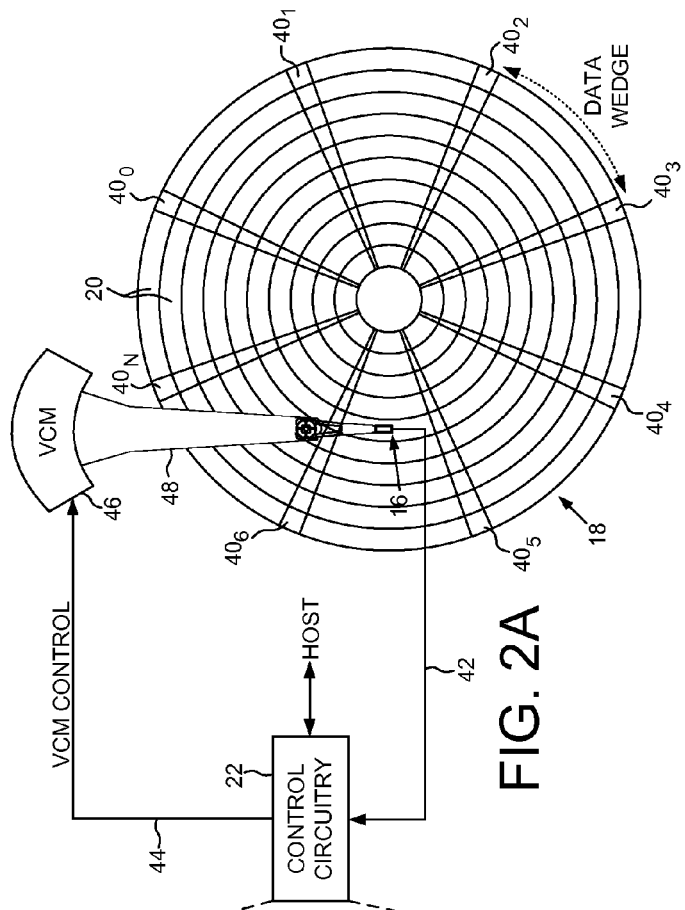
FIG. 2A shows a disk drive according to an embodiment of the present invention comprising a head actuated over a disk, and control circuitry for defect scanning the data tracks on the disk.

FIG. 2A shows a disk drive according to an embodiment of the present invention comprising a head 16 actuated over a disk 18 comprising a plurality of data tracks 20. The disk drive further comprises control circuitry 22 operable to execute the flow diagram of FIG. 2B to detect defects on the disk 18. Data is read from one of the data tracks to generate a read signal (step 24), and a quality metric is generated in response to the read signal (step 26). When the quality metric exceeds a first threshold (step 28), a defect is detected in at least part of the data track (step 30). When the quality metric exceeds a second threshold different than the first threshold (step 32), the data track is reread (step 24) to regenerate the quality metric (step 26), and when the quality metric exceeds the second threshold at least twice (step 38), the defect is detected (step 30).

In the embodiment of FIG. 2A, the disk 18 comprises a plurality of servo sectors $40_0$-$40_N$ that define the plurality of data tracks 20. The control circuitry 22 processes the read signal 42 to demodulate the servo sectors $40_0$-$40_N$ into a position error signal (PES). The PES is filtered with a suitable compensation filter to generate a control signal 44 applied to a voice coil motor (VCM) 46 which rotates an actuator arm 48 about a pivot in order to position the head 16 radially over the disk 18 in a direction that reduces the PES. The servo sectors $40_0$-$40_N$ may comprise any suitable position information, such as a track address for coarse positioning and servo bursts for fine positioning.

Figure 1A:
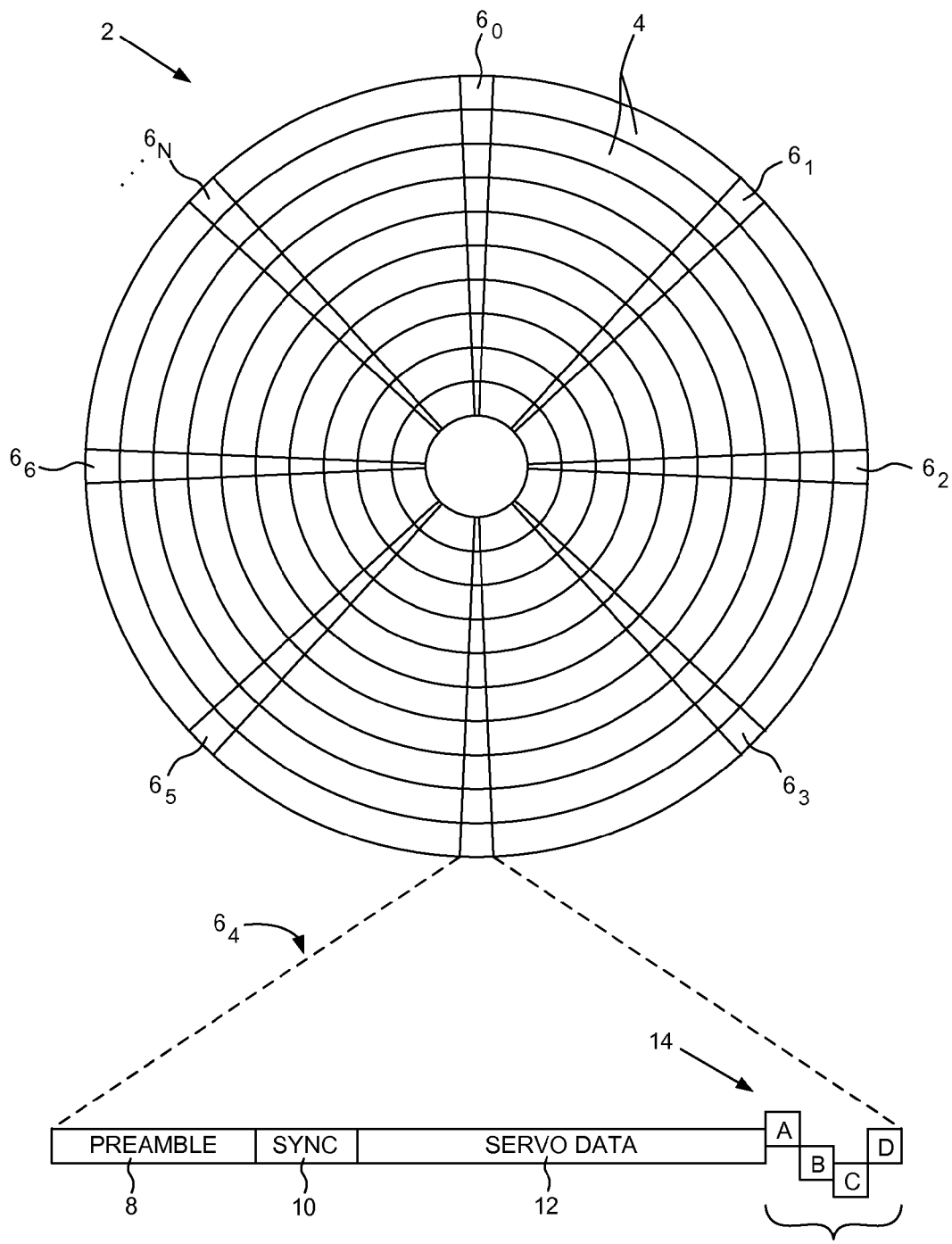
FIG. 1A shows a prior art disk format comprising a plurality of data tracks defined by servo sectors.

In one embodiment, the data tracks are divided into a number of data sectors, wherein each data sector comprises a preamble, sync mark, and data field similar to a servo sector described above with reference to FIG. 1A. When performing the defect scan, data (e.g., a 2T test pattern) may be written to and then read from each individual data sector. In another embodiment, data may be written over the entire area between servo sectors referred to as a data wedge. When a defect is detected, one or more data sectors may be mapped out so it's not used to store user data. In other embodiments, an entire data wedge or even a whole data track may be mapped out.

In the embodiments of the present invention, the first threshold is more stringent than the second threshold meaning that if the quality metric exceeds the first threshold a defect is detected immediately without needing to reread the data track in order to verify the defect. In other words, when the quality metric indicates a high probability that a defect exists because it exceeds the more stringent first threshold, the step of rereading the data track is skipped which expedites the defect scan.

Any suitable quality metric may be generated from the read signal during the defect scan, such as measuring the amplitude of the read signal, timing recovery phase errors, least mean square of the difference between read signal samples and expected samples, branch metrics generated by a Viterbi detector, log likelihood ratios generated by an iterative detector, bit errors detected by an error correction code (ECC) decoder, etc. In addition, a high quality metric may represent either a high or low signal quality depending on the implementation such that a defect may be detected in one embodiment if the quality metric falls below a threshold, and in an alternative embodiment a defect is detected if the quality metric rises above a threshold. In one embodiment, multiple quality metrics may be generated and compared to respective thresholds, wherein the magnitude and/or polarity of each quality metric may vary relative to one another. For example, a first quality metric may indicate a defect when it falls below a threshold, and a second quality metric may indicate a defect when it rises above a threshold. The combination of the quality metrics as compared to their respective thresholds may be evaluated to determine whether a defect is detected.

Figure 2B:
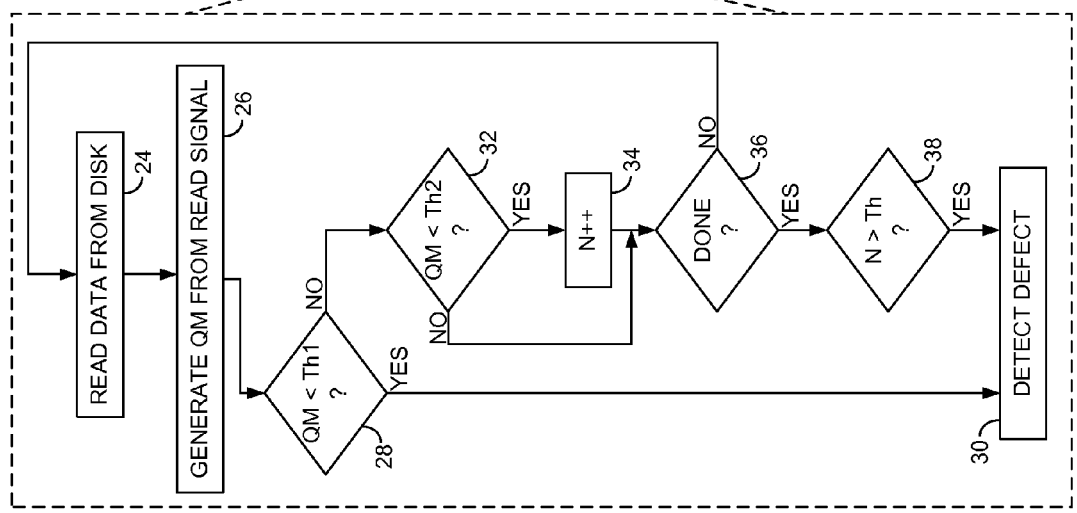
FIG. 2B is a flow diagram executed by the control circuitry according to an embodiment of the present invention wherein a hard defect is detected if a quality metric falls below a first threshold less than a second threshold.

In the embodiment of FIG. 2B, the amplitude of the quality metric is proportional to the quality of the read signal such that a defect is detected immediately if the quality metric falls below a first threshold (step 28). This type of defect is referred to as a "hard defect" since the likelihood is very high that the media contains a true defect at the corresponding location. If the quality metric is higher than the first threshold, the quality metric is compared to a second threshold (step 32) higher than the first threshold. Since the second threshold is higher, the corresponding probability of detecting a defect is higher. Therefore to avoid detecting a false defect, the disk location is read multiple times and a counter N incremented each time the quality metric falls below the second threshold (step 34). After rereading the disk location multiple times (step 36), a defect is detected at the disk location if the counter N exceeds a threshold (step 38). That is, a defect is detected at the location if the quality metric falls below the second threshold at least twice which helps ensure an actual defect is detected (as opposed to transient noise in the read signal). If while rereading the disk location the quality metric falls below the first threshold (step 28), then a hard defect is immediately detected at that location (step 30). This embodiment may expedite the defect scan by avoiding or reducing the number of rereads if the quality metric falls below the first threshold.

Figure 3:
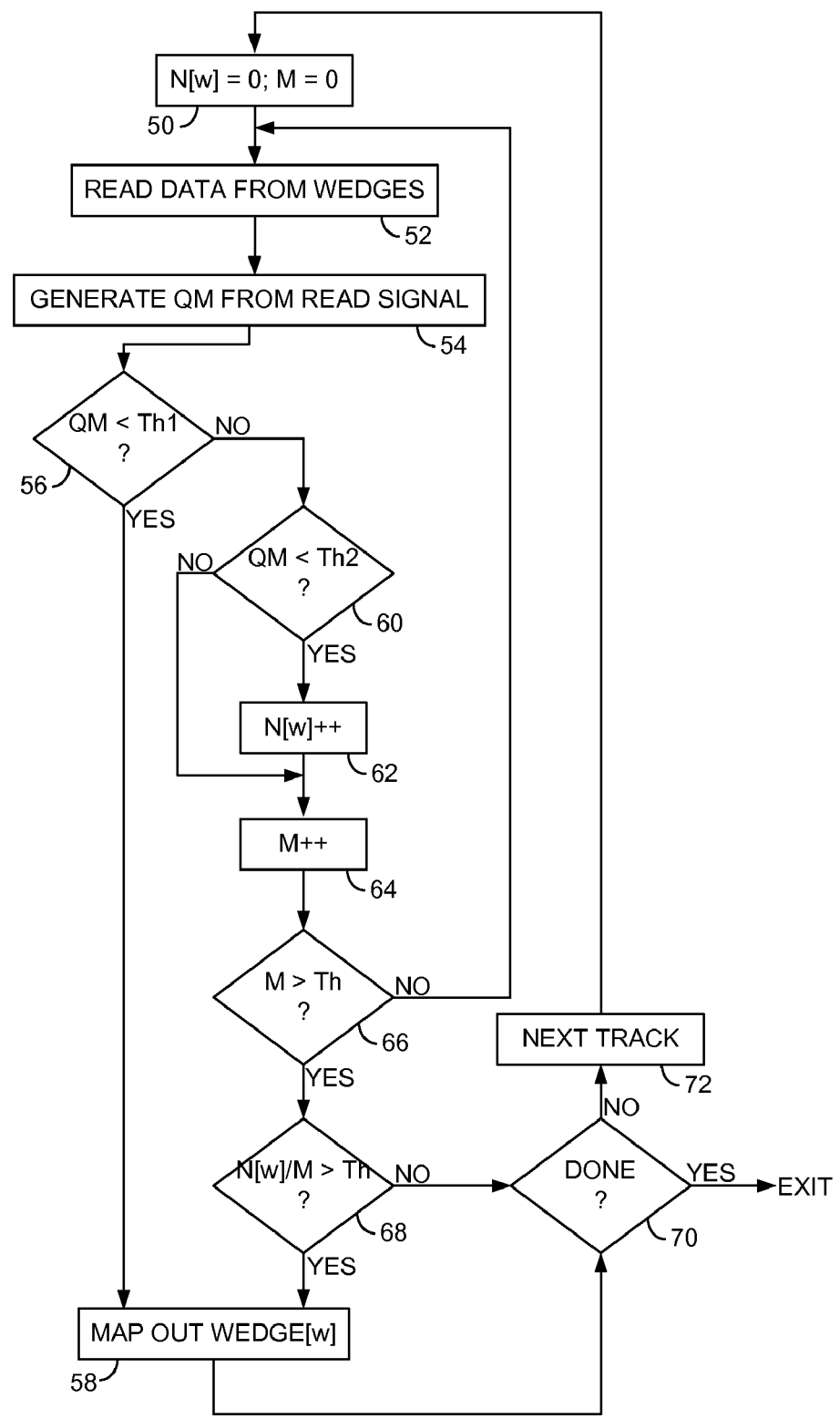
FIG. 3 is a flow diagram according to an embodiment of the present invention wherein a data wedge is mapped out if the corresponding quality metric falls below the second threshold N/M times.

FIG. 3 shows a flow diagram according to an embodiment of the present invention wherein data is read from all the data wedges in a data track during each disk revolution. If the quality metric of any data wedge falls below the first threshold, the data wedge is mapped out as defective. Otherwise, a counter is maintained for each data wedge and incremented during each disk revolution if the quality metric falls below the second threshold. An array of counters N[w] corresponding to the number of data wedges is initialized to zero as well as a reread counter M (step 50). Data is then read from each data wedge during the current disk revolution (step 52) and a quality metric generated for each data wedge (step 54). If the quality metric of any data wedge falls below the first threshold (step 56), the data wedge is mapped out as defective (step 58). Otherwise, if the quality metric of a data wedge falls below the second threshold (step 60), the corresponding counter N[w] is incremented (step 62). The reread counter M is incremented (step 64) and if the reread counter is less than a threshold (step 66), the process is repeated for the next disk revolution. After rereading the data track a number of times, the ratio of the counter N to M for each data wedge is compared to a threshold (step 68). If the ratio is greater than a threshold, then the corresponding data wedge is mapped out as defective (step 58). If there are more tracks to process (step 70), the flow diagram of FIG. 3 is repeated for the next data track (step 72).

In one embodiment, if during the first disk revolution the quality metric generated for each data wedge does not exceed the first and second thresholds, the data track is considered defect free and the defect scan terminates without executing any rereads. In another embodiment, a data track may be read multiple times regardless as to the outcome of the first disk revolution. For example, in one embodiment each data track may be read at least twice to ensure the quality metric remains above both thresholds for each data wedge before considering the data track defect free.

Figure 4:
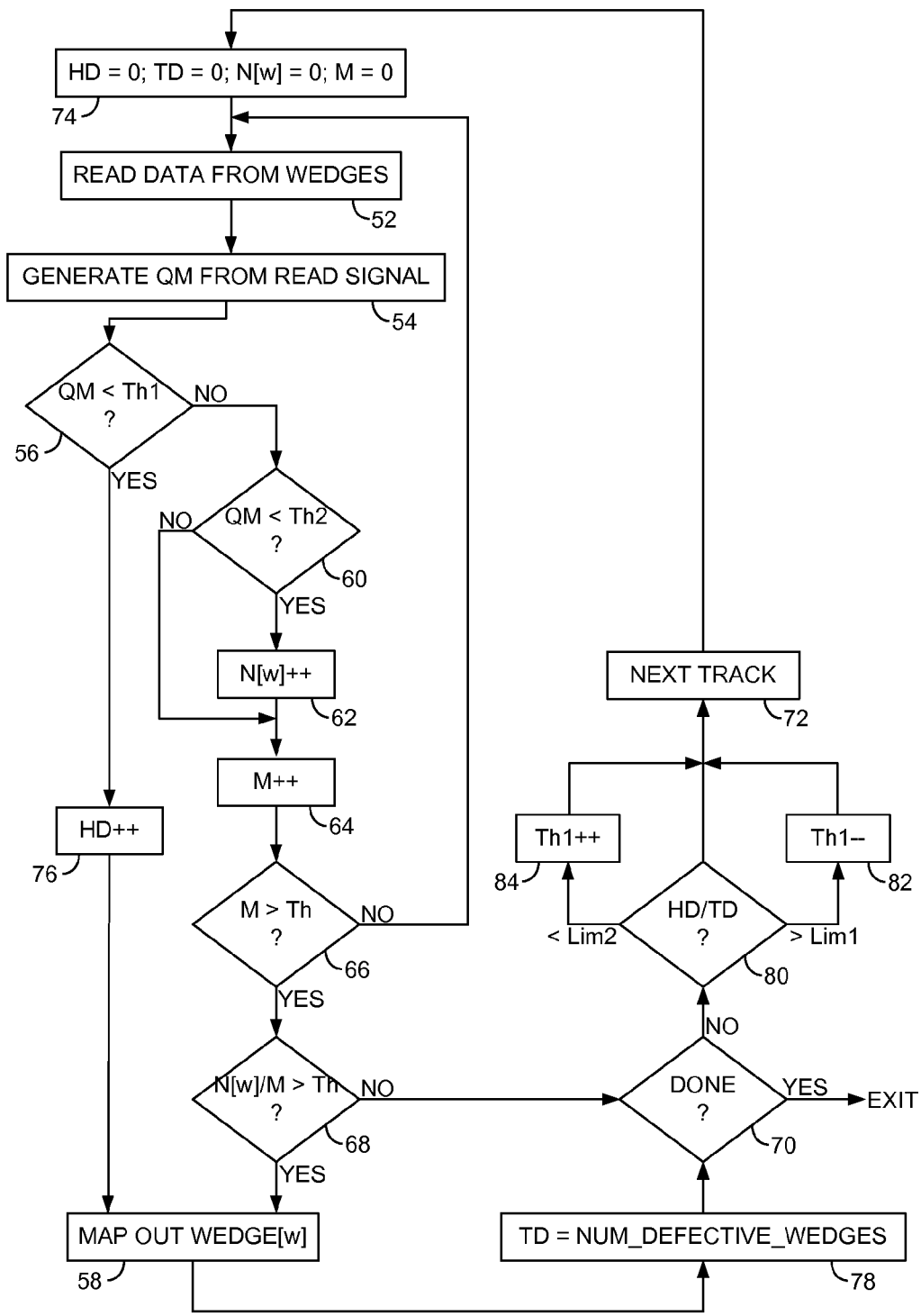
FIG. 4 is a flow diagram according to an embodiment of the present invention wherein the first threshold is adapted to maintain a target ratio of hard defects detected to the total number of defects detected.

Any suitable value may be assigned to the first and second thresholds. In one embodiment, a number of disk drives out of a family of disk drives are evaluated to determine a nominal value for the first and second thresholds. The nominal threshold values are then used for the family of disk drives. In another embodiment, the control circuitry within each disk drive may adjust the first threshold during the defect scan process to maintain a target ratio of the number of hard defects detected to the total number of defects detected. This embodiment is illustrated in the flow diagram of FIG. 4 which extends on the flow diagram of FIG. 3. Before processing each data track, a hard defect counter HD and a total defect counter TD are initialized to zero (step 74). Each time the quality metric falls below the first threshold (step 56), the hard defect counter HD is incremented (step 76). After rereading the data track a number of times, the counters N[w] for the remaining wedges are evaluated (step 68) to detect additional defective data wedges. Each time a defective data wedge is detected (step 58), the total defect counter TD is incremented such that after performing the rereads the total defect counter TD equals the total number of defective data wedges in the data track (step 78). Prior to processing the next data track, the ratio of the hard defect counter HD to the total defect counter TD is evaluated (step 80). If the ratio is greater than a first limit, the first threshold is decreased (step 82) in order to decrease the probability of detecting hard defects in the next data track. If the ratio is less than a second limit, the first threshold is increased (step 84) to increase the probability of detecting hard defects in the next data track.

Adjusting the first threshold to maintain a target ratio of hard defects to total defects is illustrated in FIG. 5. When the current value of the first threshold is set too high such that too many hard defects are being detected, the first threshold is decreased so that fewer hard defects are detected. Similarly, if the number of hard defects detected becomes too small, the first threshold may be increased so that more hard defects are detected. This embodiment helps maintain a desired level of defect scan performance while keeping sufficiently low the number of false defects that may be detected using the first threshold.

Figure 1B:
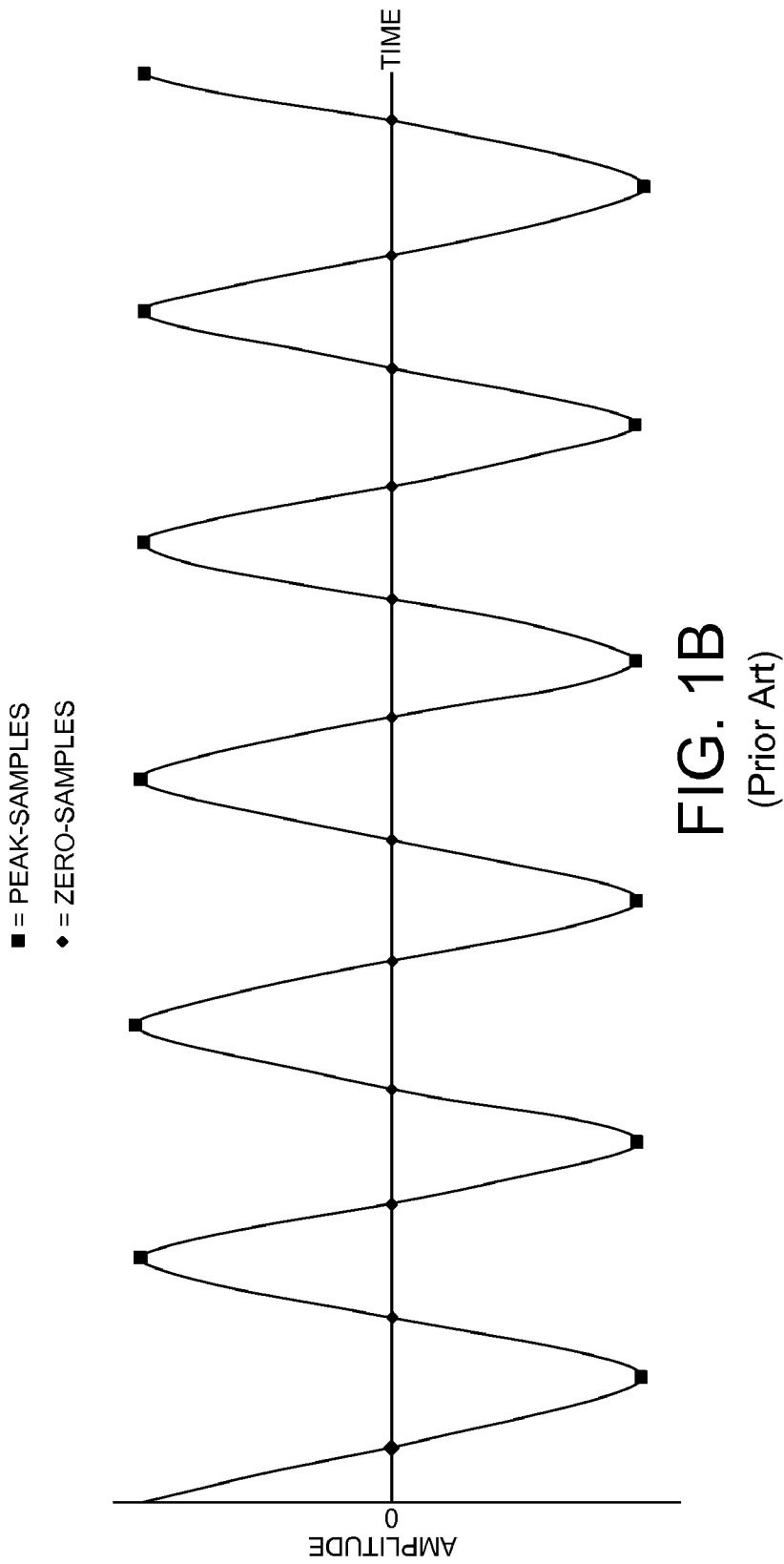
FIG. 1B shows a sinusoidal read signal generated from reading a 2T test pattern during a defect scan of one of the data tracks.

Any suitable data may be read from the disk during the defect scan process. In one embodiment, the data comprises a 2T test pattern such that the read signal comprises a sinusoid as shown in FIG. 1B. In other embodiments, the data may be a DC erase signal such that the read signal is a constant signal (perturbed by defects). In yet other embodiments, the data may comprise random data that may change each time a reread is executed.

In one embodiment, the control circuitry 22 within each disk drive may write the data to the disk during the defect scan process. The data may be written just prior to defect scanning each data track, or the data may be written to a number of the data tracks prior to defect scanning each data track. In another embodiment, the data may be prewritten to each disk surface, for example, using a media writer. The media writer may write a specific pattern to each data track (e.g., a 2T test pattern), or the media writer may erase all of the data tracks by writing a DC signal to each data track. In another embodiment, the disk may be written with a test pattern or DC erased using a master "stamping disk", and in yet another embodiment, each disk may be fabricated so that each disk surface is initially DC erased.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data tracks;
   a head actuated over the disk; and
   control circuitry operable to:
      read data from one of the data tracks to generate a read signal;
      generate a quality metric in response to the read signal;
      when the quality metric exceeds a first threshold, detect a defect in at least part of the data track; and
      when the quality metric exceeds a second threshold different than the first threshold:
         reread the data track to regenerate the quality metric; and
         when the quality metric exceeds the second threshold at least twice, detect the defect.

2. The disk drive as recited in claim 1, wherein:
   the control circuitry is operable to detect the defect when the quality metric falls below the first threshold;
   when the quality metric does not fall below the first threshold, the control circuitry is operable to detect the defect when the quality metric falls below the second threshold at least twice; and
   the first threshold is lower than the second threshold.

3. The disk drive as recited in claim 1, wherein the control circuitry is operable to detect the defect when the quality metric exceeds the second threshold N out of M rereads, where N and M are integers.

4. The disk drive as recited in claim 1, wherein the control circuitry is operable to detect the defect when the quality metric exceeds the first threshold when rereading the data track.

5. The disk drive as recited in claim 1, wherein the control circuitry is further operable to adjust the first threshold in response to a number of defects detected by the first threshold.

6. The disk drive as recited in claim 5, wherein:
   when a ratio of the number of defects detected by the first threshold to a total number of defects rises above a limit, the control circuitry is operable to adjust the first threshold to reduce a probability of detecting defects; and
   when the ratio falls below a limit, the control circuitry is operable to adjust the first threshold to increase the probability of detecting defects.

7. The disk drive as recited in claim 1, wherein:
   each data track comprises a plurality of data wedges defined by a plurality of servo sectors; and
   the control circuitry is operable to read data from each data wedge and detect the defect in one of the data wedges.

8. A method of operating a disk drive, the disk drive comprising a head actuated over a disk comprising a plurality of data tracks, the method comprising:
   reading data from one of the data tracks to generate a read signal;
   generating a quality metric in response to the read signal;
   when the quality metric exceeds a first threshold, detecting a defect in at least part of the data track; and
   when the quality metric exceeds a second threshold different than the first threshold:
      rereading the data track to regenerate the quality metric; and
      when the quality metric exceeds the second threshold at least twice, detecting the defect.

9. The method as recited in claim 8, wherein:
   the defect is detected when the quality metric falls below the first threshold;
   when the quality metric does not fall below the first threshold, the defect is detected when the quality metric falls below the second threshold at least twice; and
   the first threshold is lower than the second threshold.

10. The method as recited in claim 8, wherein the defect is detected when the quality metric exceeds the second threshold N out of M rereads, where N and M are integers.

11. The method as recited in claim 8, wherein the defect is detected when the quality metric exceeds the first threshold when rereading the data track.

12. The method as recited in claim 8, further comprising adjusting the first threshold in response to a number of defects detected by the first threshold.

13. The method as recited in claim 12, wherein:
   when a ratio of the number of defects detected by the first threshold to a total number of defects rises above a limit, further comprising adjusting the first threshold to reduce a probability of detecting defects; and
   when the ratio falls below a limit, further comprising adjusting the first threshold to increase the probability of detecting defects.

14. The method as recited in claim 8, wherein:
   each data track comprises a plurality of data wedges defined by a plurality of servo sectors; and
   further comprising reading data from each data wedge and detecting the defect in one of the data wedges.

* * * * *